United States Patent
Steinhilber

(10) Patent No.: US 6,865,046 B2
(45) Date of Patent: Mar. 8, 2005

(54) AUTOMATIC LIBRARY FOR DATA STORAGE TAPE CARTRIDGES

(75) Inventor: Friedhelm Steinhilber, Rottweil (DE)

(73) Assignee: Patentia Hergiswil AG, Hergiswil (CH)

( * ) Notice: Subject to any disclaimer, the term of this patent is extended or adjusted under 35 U.S.C. 154(b) by 377 days.

(21) Appl. No.: 10/005,966

(22) Filed: Nov. 8, 2001

(65) Prior Publication Data

US 2002/0149870 A1 Oct. 17, 2002

Related U.S. Application Data

(60) Provisional application No. 60/247,205, filed on Nov. 9, 2000, provisional application No. 60/247,204, filed on Nov. 9, 2000, and provisional application No. 60/247,153, filed on Nov. 9, 2000.

(30) Foreign Application Priority Data

Nov. 9, 2000 (DE) .......................................... 100 55 625

(51) Int. Cl.⁷ .............................................. G11B 15/18
(52) U.S. Cl. ...................................................... 360/69
(58) Field of Search .................... 360/69, 9.2; 294/116; 414/753, 741, 280; 369/36, 34; 242/337, 337.1

(56) References Cited

U.S. PATENT DOCUMENTS

| | | | | |
|---|---|---|---|---|
| 3,378,827 A | * | 4/1968 | Rudolph | 360/92 |
| 3,494,622 A | * | 2/1970 | Zeigler, Jr. | 360/92 |
| 3,682,480 A | * | 8/1972 | Ban | 360/92 |
| 3,756,609 A | * | 9/1973 | Sato | 360/92 |
| 3,807,741 A | * | 4/1974 | Uemura | 360/92 |
| 4,063,294 A | | 12/1977 | Burkhart | 360/92 |
| 4,361,858 A | * | 11/1982 | Chambers | 360/92 |
| 4,471,394 A | * | 9/1984 | Hapke | 360/92 |
| 5,148,332 A | * | 9/1992 | Tomita et al. | 360/92 |
| 5,236,258 A | | 8/1993 | Bunch | 312/9.31 |
| 5,469,310 A | | 11/1995 | Slocum et al. | 360/92 |
| 5,555,143 A | * | 9/1996 | Hinnen et al. | 360/92 |
| 5,588,796 A | | 12/1996 | Ricco et al. | 414/741 |
| 5,640,288 A | * | 6/1997 | Horie | 360/98.04 |
| 5,856,894 A | * | 1/1999 | Marlowe | 360/92 |
| 6,175,467 B1 | * | 1/2001 | Schneider et al. | 360/92 |
| 6,381,089 B1 | * | 4/2002 | Helmick et al. | 360/92 |

FOREIGN PATENT DOCUMENTS

| | | | | |
|---|---|---|---|---|
| EP | 1045382 A2 | 10/2000 | | G11B/15/68 |
| JP | 05225666 A | 3/1993 | | G11B/15/68 |

* cited by examiner

*Primary Examiner*—Sinh Tran
*Assistant Examiner*—K. Wong
(74) *Attorney, Agent, or Firm*—Baker Botts L.L.P.

(57) ABSTRACT

An automatic library for cartridges of a data storage tape comprises a magazine with a plurality of receivers for holding the cartridges. The magazine revolves on a closed path of revolution about at least one drive. The path of revolution of the magazine is non-circular and may have the shape of a rectangle with rounded-off corners. Thus, a low installation width of the library is provided.

6 Claims, 3 Drawing Sheets

AUTOMATIC LIBRARY FOR DATA STORAGE TAPE CARTRIDGES

This application claims benefit of Ser. No. 60/247,205 filed Nov. 9, 2000, and claims benefit of Ser. No. 60/247,204 filed Nov. 9, 2000, and claims benefit of Ser. No. 60/247,153 filed Nov. 9, 2000.

BACKGROUND OF THE INVENTION

1. Field of the Invention

The invention relates to an automatic library for cartridges. In particular, the invention relates to an automatic library for cartridges of a data storage tape.

2. Related Art

For the storage of relatively large quantities of data are used data storage tapes, in particular magnetic storage tapes which, for simpler handling, are contained in cartridges. In order to increase the storage capacity further, automatic libraries are used, which are available on the market under the designations "tape library" or "tape cartridge library" or "tape cartridge autoloader". Such libraries comprise a magazine which can contain a multiplicity of cartridges which, selected under control, can be changed into a tape cartridge drive.

In order to be able to develop such an automatic library with compact outer dimensions, it is known, for example from U.S. Pat. No. 5,236,258, to dispose the drive or two drives within the magazine, wherein the magazine in the form of a carousel containing the cartridges, revolves on a circular path about the drive.

In a conventional magazine revolving on a circular path, the diameter of the path is determined in its minimum by the diagonal of the right parallelepiped form drive. This diameter also defines the minimum width of the library transversely to the direction of insertion of the drive and therewith the installation width of the library overall.

BRIEF DESCRIPTION OF THE DRAWINGS

In the following the invention will be explained in further detail in conjunction with embodiment examples depicted in the drawings, in which.

DESCRIPTION OF CERTAIN EMBODIMENTS OF THE INVENTION

One embodiment of the invention comprises a magazine revolving on a path about at least one drive with the path approximating the shape of the drive. According to an embodiment of the invention, the path of revolution of the magazine extends at the sides of at least one drive closer to these sides than would correspond to the circular path, whereby the dimension of width of the magazine, and therewith the installation width of the overall library, is reduced. In one embodiment, the least width is obtained with the path of revolution at these sides of the drive passing along a straight line parallel to the direction of insertion, and therewith close to the side wall of the drive. In this embodiment, the entire path of revolution forms a rectangle whose corners are rounded-off for deflecting the receivers for the cartridges.

In one embodiment of the invention, the cartridges and the drive are disposed lying flat in a common plane which is also the plane of revolution of the magazine. Thus, apart from the low installation width, additionally an extremely low overall height of the library is obtained.

In another embodiment of the invention, the cartridges are disposed standing on end in the magazine wherein the drive is also disposed with the cartridge pocket standing on end. While compared to the above described embodiment, this disposition results in a greater overall height of the library, the number of cartridges contained in the magazine can be substantially increased. In a further embodiment, two or more drives may be disposed within the magazine whose vertical cartridge pockets are disposed parallel one next to the other. The use of two or more drives offers the advantage that two tapes can run simultaneously. It is also possible to change the cartridge in a drive while in the other drive a tape is running, whereby time losses due to cartridge changes can be avoided.

Figure 1:
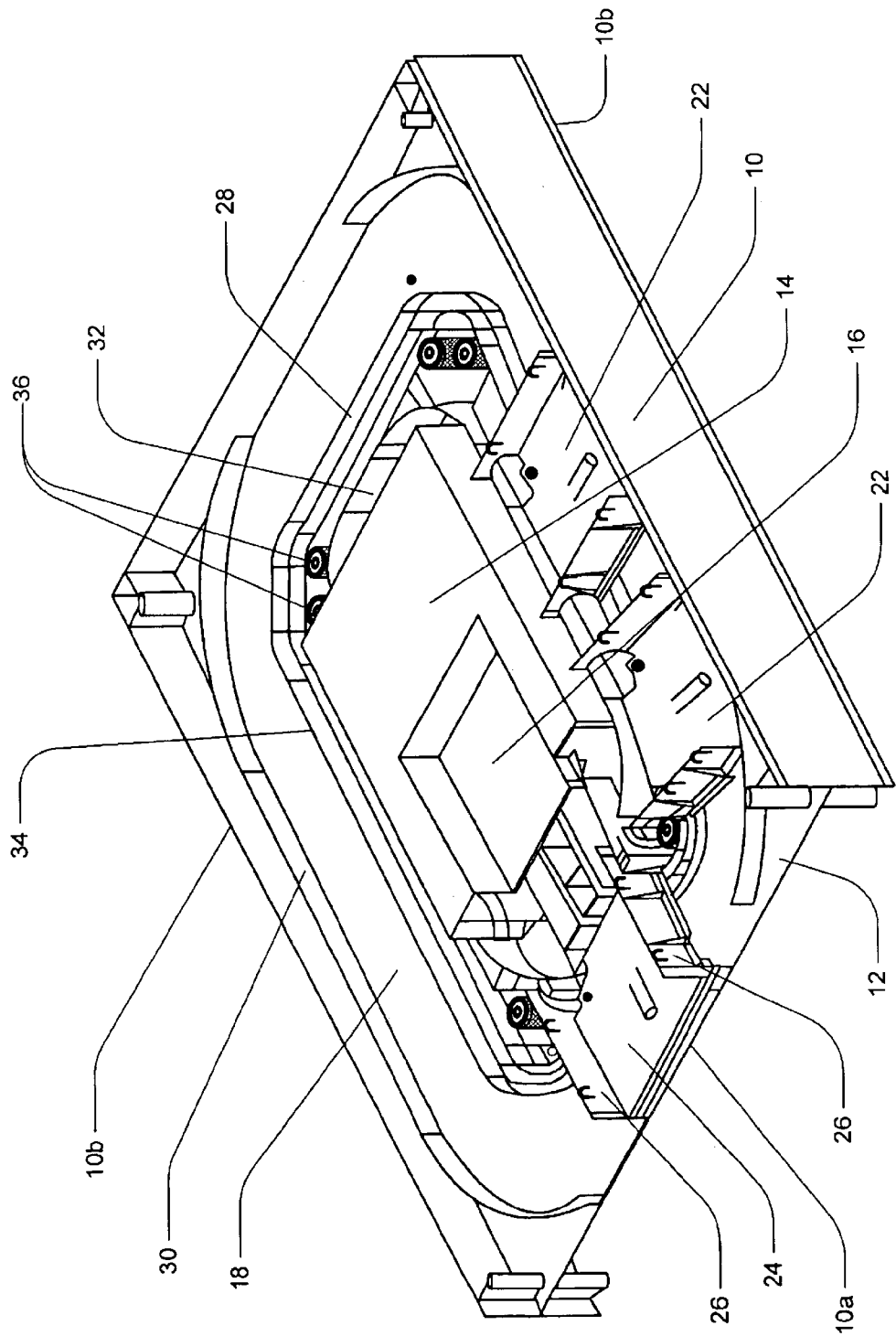
FIG. 1 is a perspective view of a library in a first embodiment.
Figure 2:
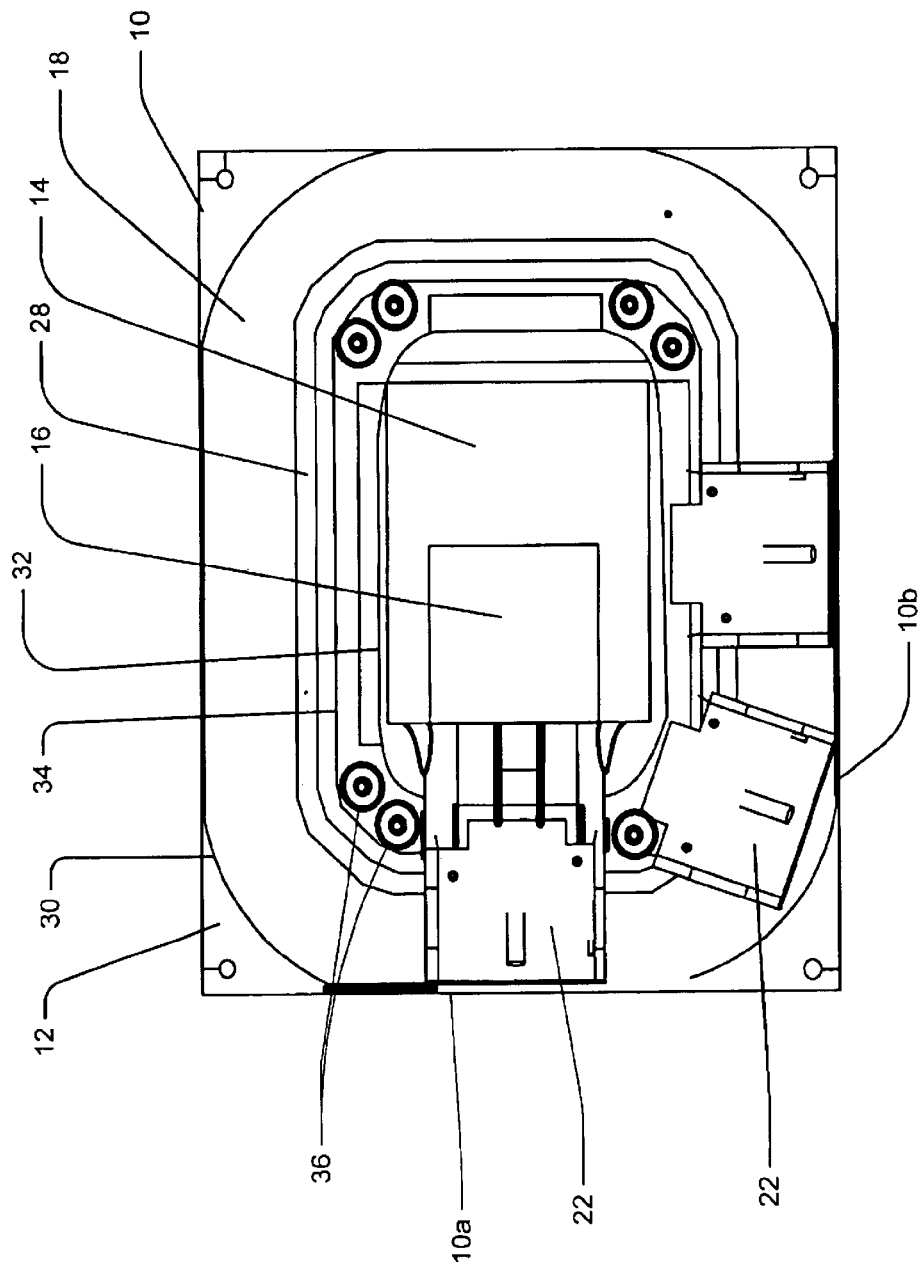
FIG. 2 is a top view onto the library of FIG. 1.

In the embodiment example depicted in FIGS. 1 and 2 the library (tape library) comprises a housing 10, whose cover panel and front panel have been omitted in the drawing. The housing 10 has the shape of a flat right parallelepiped of low height in which the width of the front side 10*a* is less than the depth of the longitudinal sides 10*b*. A base plate 12 is disposed horizontally in the housing 10. A drive 14 for data storage tapes, in particular for magnetic storage tapes, is disposed substantially centrally on the base plate 12. The drive 14 is disposed such that the insertion direction of a cartridge pocket 16 is directed toward the narrow front side 10*a* of the housing 10 and, consequently, the direction of insertion of the cartridge pocket 16 extends parallel to the longitudinal sides 10*b* of the housing 10. The drive 14 may have the shape of a flat right parallelepiped which rests with its flat side on the base plate 12, such that the cartridge pocket 16 is also disposed with its flat side parallel to the base plate 12.

A magazine 18 for the cartridges 20, not shown in FIGS. 1 and 2, is provided on a path of revolution on the base plate 12. The path of revolution of the magazine 18 encompasses the drive 14 and extends within the walls of the housing 10. Thus, the path of revolution of the magazine 18 comprises two straight sections, parallel to one another, between the longer sides of the housing 10 and of the drive 14.

Cartridges 20 are disposed to lie flat in the magazine 18 with their flat side in the plane of the path of revolution and thus in the plane of the cartridge pocket 16. The path of revolution of magazine 18 consequently has overall the shape of a rectangle with rounded-off corners inscribed between the outsides of the housing 10 and the drive 14.

As is evident in FIGS. 1 and 2, thereby for the entire library, an extremely low overall height is obtained. Additionally, in spite of the flat-lying disposition of the cartridges 20 in the revolving magazine 18, a space-saving width dimension can be maintained.

In order to transport the cartridges 20 on the path of revolution of magazine 18, carriers 22 are provided which may have the form of drawers comprising a bottom 24 in the plane of revolution and side guidances 26 disposed substantially radially with respect to the path of revolution. The bottom 24 and the side guidances 26 may be dimensioned such that each carrier 22 can contain a flat-lying cartridge 20. The carriers 22 may be guided on their underside in a guidance slot 28 developed in the base plate 12 of the housing and corresponding to the form of the path of revolution of the magazine 18. An outer fence 30, encompassing the path of revolution of the magazine on its outer circumference, and an inner fence 32, forming the inner contour of the path of revolution, may close off the carriers 22 on the path of revolution on its radially outer and radially inner sides. Thus, the cartridges 20 lying in the carriers 22 during the revolution may be held in the magazine 18 on the carriers 22 laterally through the side guidances 26 and radially through the outer fence 30 and the inner fence 32.

In the base plate 12 may further be provided a drive for the carriers 22. This drive may comprise continuously revolving driving means which, in the embodiment example of FIGS. 1 and 2, may comprise a continuously revolving toothed belt 34. The toothed belt 34 runs over deflection wheels 36 at the corners of the path of revolution. The deflection wheels 36 may also bring about the driving of the toothed belt 34 by means of, for example, an electric motor. The carriers 22 may be secured in the toothed belt 34 and may thereby be moved by means of the driven toothed belt 34 on the path of revolution of magazine 18. The carriers 22, and with them the cartridges 20 contained in the carriers, may be positioned through control of the driving.

In the embodiment example depicted in FIGS. 1 and 2, the magazine 18 is dimensioned such that up to eight carriers 22 revolve around the drive 14 such that the magazine can contain eight cartridges 20, although only three are illustrated. Other embodiments may be dimensioned for any practical number of carriers.

The magazine 18 and the motion of revolution of the carriers 22 with the cartridges 20 are controllable such that each of the carriers 22 can be selectively positioned on the front side of the housing 10. In this position, the particular carrier 22 is oriented aligned with the cartridge pocket 16 of the drive 14. In the region of this position the inner fence is cut out such that a cartridge 20 located in the carrier 22 can be slid into the cartridge pocket 16 or a cartridge 20 located in the cartridge pocket 16 can be ejected into the carrier 22. In this way an automatic cartridge change may be possible. A cartridge 20 located in the cartridge pocket 16 may be transported into a free carrier 22. The magazine 18 is subsequently driven in order to position a carrier 22 with a selected cartridge 20 in front of the cartridge pocket 16 and to transport this cartridge subsequently into the cartridge pocket 16 of the drive 14.

In the front side 10a of the housing 10 is provided a port (not shown) in the region in which the carrier 22 is disposed in an alignment orientation with the cartridge pocket 16 of the drive 14. Through this port a cartridge 20 can be removed from the particular carrier 22 of the magazine or a cartridge 20 can be placed into the carrier 22 of the magazine 18. Thereby the exchange of the cartridges 20 in the magazine 18 is made possible.

In this position, the port, the carrier 22 and the cartridge pocket 16 of the drive 14 may be disposed in a continuous alignment. It is therefore possible to insert cartridges 20 directly from the outside through the port, via the carrier 22, into the cartridge pocket 16, or to remove them from the cartridge pocket 16, via the carrier 22 and the port, to the outside. With the magazine idle, the library can thus be used in the same manner as a tape drive without a magazine.

Figure 3:
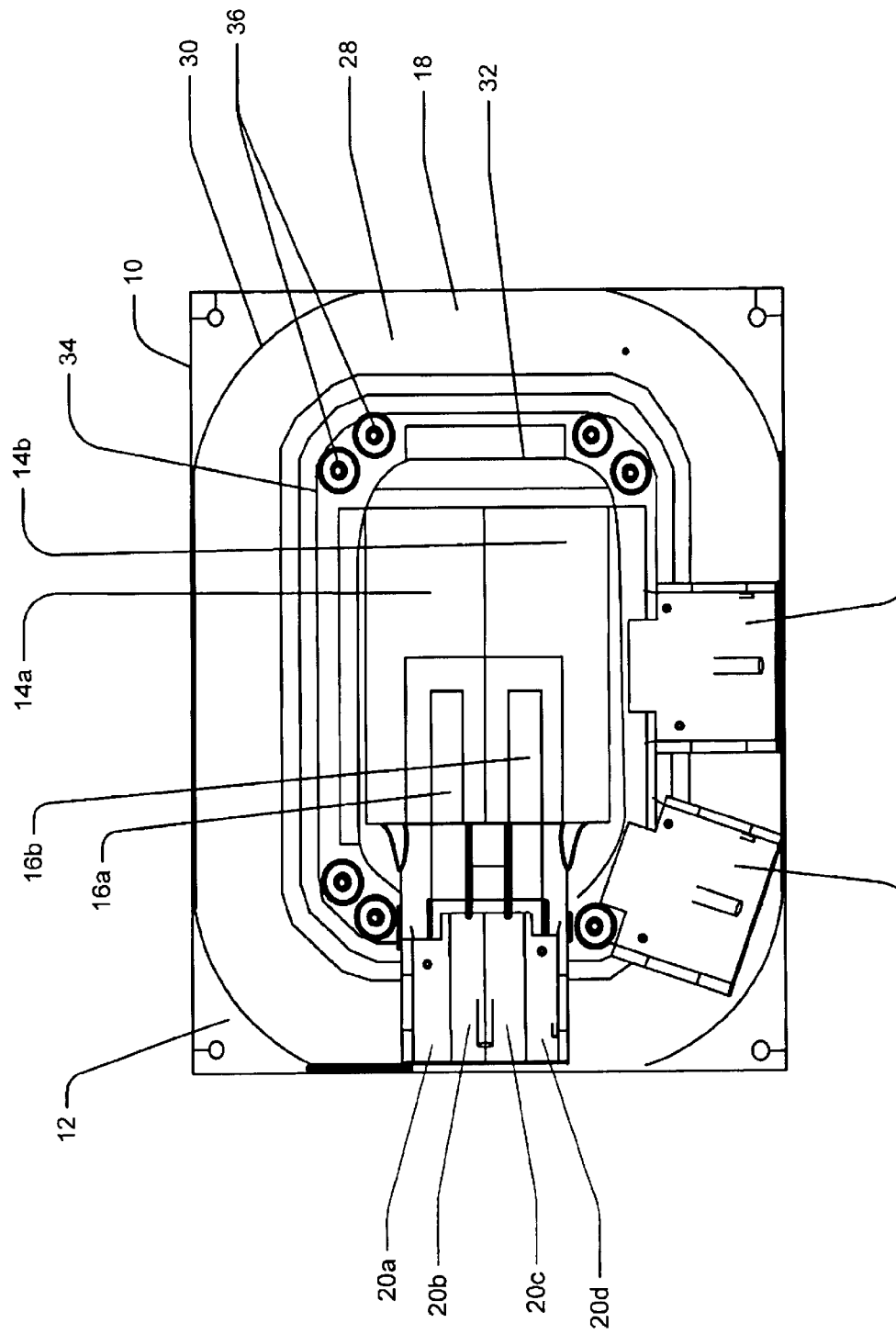
FIG. 3 is a representation of a second embodiment of the invention.

In FIG. 3, a further embodiment example is shown. In this embodiment example, the magazine revolves in a path of revolution which may be similar to that of the preceding embodiment example of FIGS. 1 and 2. However, within the path of revolution two drives 14a, 14b may be disposed standing on end and parallel to one another. The cartridge pockets 16a, 16b of the two drives 14a, 14b are thereby disposed vertically and parallel, one next to the other, and oriented toward the front side 10a of the housing 10. Although FIG. 3 illustrates an embodiment with two drives, embodiments with more drives are also contemplated within the scope of the invention, as well as an embodiment with a single drive.

On the carriers 22 are disposed in the corresponding receivers several cartridges. FIG. 3 illustrates an embodiment example with four cartridges 20a, 20b, 20c, 20d standing on end and parallel one next to the other. In this way, the capacity of the library can be significantly increased. Consequently, in the embodiment example shown with eight carriers 22, thirty-two cartridges can be contained in the magazine. The installation width of the library is unchanged compared to the embodiment example of FIGS. 1 and 2. The overall height, however, is greater since the cartridges 20 and the drives 14a, 14b are disposed standing on end.

The carriers 22 are positionable in several positions in front of the drives 14a, 14b in which the particular carrier 22 is offset parallel to the front side of the drives 14a, 14b and parallel to the front side 10a of housing 10. Through this positioning it is possible to position every cartridge 20a, 20b, 20c, 20d in front of the cartridge pocket 16a, 16b of every drive 14a or 14b. It thereby may be possible to selectively change all of the cartridges 20 stored in the magazine into each of the cartridge pockets 16a, 16b.

While particular embodiments of the present invention have been disclosed, it is to be understood that various different modifications and combinations are possible and are contemplated within the true spirit and scope of the appended claims. There is no intention, therefore, of limitations to the exact abstract or disclosure herein presented.

| LIST OF REFERENCE SYMBOLS | |
|---|---|
| 10 | Housing |
| 10a | Front side |
| 10b | Longitudinal side |
| 12 | Drive |
| 14 | Drive |
| 14a | Drive |
| 14b | Drive |
| 16 | Cartridge pocket |
| 16a | Cartridge pocket |
| 16b | Cartridge pocket |
| 18 | Magazine |
| 20 | Cartridge |
| 20a | Cartridge |
| 20b | Cartridge |
| 20c | Cartridge |
| 20d | Cartridge |
| 22 | Carriers |
| 24 | Bottom |
| 26 | Side guidances |
| 28 | Guidance slot |
| 30 | Outer fence |
| 32 | Inner fence |
| 34 | Toothed belt |
| 36 | Deflection wheels |

What is claimed is:

1. An automatic library for cartridges of a data storage tape, comprising:

at least one drive for cartridges, said cartridges having the form of flat right parallelepiped, each said drive having a cartridge pocket adapted to receive a cartridge; and a magazine, said magazine comprising one or more receivers for said cartridges, each of said receivers being adapted to revolve on a closed path of revolution about said at least one drive, wherein the cartridges are disposed in the receivers of the magazine and in the cartridge pocket of the at least one drive standing on end with respect to the plane of the path of revolution of the magazine;

wherein the magazine comprises revolving carriers which contain the cartridges, at least two cartridges are disposed on each carrier and the carriers are positionable offset parallel to a front side comprising the cartridge pocket of the at least one drive, such that each of the cartridges disposed on the carrier is positionable in front of the cartridge pocket of each drive;

wherein said cartridge pocket of a drive and the receivers of the magazine are disposed such that the magazine is positionable with one of said receivers being aligned with the cartridge pocket of a drive along an insertion axis for transfer of a cartridge, wherein said at least one drive has a plurality of side walls enclosing said drive within said path of revolution, said at least one drive further having a diagonal dimension, and wherein the path of revolution of the magazine comprises a rectangular shape around said at least one drive.

2. The library as claimed in claim 1, wherein the path of revolution of the magazine comprises straight path sections along at least one of said side walls.

3. The library as claimed in claim 2, wherein the path of revolution of the magazine has the form of a rectangle with rounded-off corners.

4. The library as claimed in claim 1, wherein at least two drives are provided with vertical cartridge pockets disposed parallel one next to the other.

5. An automatic library for cartridges of a data storage tape, comprising:

at least one drive for cartridges having a cartridge pocket adapted to receive a cartridge; and a magazine including one or more receivers for holding said cartridges, each of said receivers being adapted to revolve on a closed path of revolution about said at least one drive, wherein said receivers are adapted to hold said cartridges in an upright position and said cartridge pockets are adapted to receive said cartridges in said upright position, wherein each of said receivers is adapted to hold a plurality of cartridges, wherein each of said receivers is capable of being aligned with the cartridge pocket of each of said at least one drive along an insertion axis for transfer of a cartridge between said receiver and said cartridge pocket, and wherein the path of revolution of the magazine is noncircular.

6. A method of accessing cartridges in an automatic library, comprising:

providing at least one drive for cartridges, said cartridges having the form of a flat right parallelepiped having a flat side, each said drive having a cartridge pocket adapted to receive a cartridge;

driving one or more receivers for said cartridges on a closed path of revolution about the drive, said path of revolution being noncircular, wherein each receiver holds at least two cartridges in an upright position and said cartridge pockets are adapted to receive said cartridges in said upright position;

aligning one of said receivers with said cartridge pocket of one of said at least one drive along an insertion axis for transfer of a cartridge, and transferring a cartridge between said one of said receivers and said cartridge pocket.

* * * * *